(12) United States Patent
Tomiyama et al.

(10) Patent No.: US 10,184,542 B2
(45) Date of Patent: Jan. 22, 2019

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventors: Naoki Tomiyama, Neyagawa (JP); Yoshiyuki Hagihara, Neyagawa (JP); Koichi Higuchi, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 15/576,784

(22) PCT Filed: Jul. 21, 2016

(86) PCT No.: PCT/JP2016/071333
§ 371 (c)(1),
(2) Date: Nov. 24, 2017

(87) PCT Pub. No.: WO2017/029932
PCT Pub. Date: Feb. 23, 2017

(65) Prior Publication Data
US 2018/0306270 A1 Oct. 25, 2018

(30) Foreign Application Priority Data

Aug. 20, 2015 (JP) ................................. 2015-162957
Oct. 6, 2015 (JP) ................................. 2015-198244
(Continued)

(51) Int. Cl.
*F16F 15/134* (2006.01)
*F16F 15/14* (2006.01)
(Continued)

(52) U.S. Cl.
CPC ...... *F16F 15/13469* (2013.01); *F16F 15/145* (2013.01); *F16F 15/31* (2013.01);
(Continued)

(58) Field of Classification Search
CPC .... F16F 15/13469; F16F 15/145; F16F 15/31; F16F 15/14; F16H 25/18; F16H 45/02;
(Continued)

(56) References Cited

U.S. PATENT DOCUMENTS 3,578,822 A * 5/1971 Slemmons ......... B62D 55/0963
305/136
3,730,013 A * 5/1973 Slemmons ......... B62D 55/0963
305/197
(Continued)

FOREIGN PATENT DOCUMENTS

DE 19841418 A1 3/1999
FR 2768479 A1 3/1999
(Continued)

OTHER PUBLICATIONS

U.S. Appl. No. 15/576,755, filed Nov. 24, 2017, Exedy Corporation.
(Continued)

*Primary Examiner* — David H Bollinger
(74) *Attorney, Agent, or Firm* — United IP Counselors, LLC

(57) ABSTRACT

A torque fluctuation inhibiting device includes a mass body, a plurality of centrifugal elements, an actuation preventing mechanism and a cam mechanism. The mass body is rotatable with a rotor, and is rotatable relatively to the rotor. Each of the centrifugal elements is disposed to receive a centrifugal force to be generated by rotation of the rotor and the mass body, and is movable in a radial direction. The actuation preventing mechanism restricts at least one of the centrifugal elements from moving outward in the radial
(Continued)

direction when the rotor or the mass body is rotated at a predetermined speed or greater. The cam mechanism converts the centrifugal force into a circumferential force with use of actuation of the plurality of centrifugal elements moved in the radial direction by the centrifugal force when a relative displacement is produced between the rotor and the mass body in a rotational direction.

24 Claims, 17 Drawing Sheets

(30) Foreign Application Priority Data

| Oct. 7, 2015 | (JP) | ................................. 2015-199308 |
| Oct. 23, 2015 | (JP) | ................................. 2015-208759 |

(51) Int. Cl.
    *F16H 25/18*     (2006.01)
    *F16H 45/02*     (2006.01)
    *F16F 15/31*     (2006.01)

(52) U.S. Cl.
    CPC ............ *F16H 25/18* (2013.01); *F16H 45/02* (2013.01); *F16H 2045/0205* (2013.01); *F16H 2045/0231* (2013.01); *F16H 2045/0263* (2013.01)

(58) Field of Classification Search
    CPC ..... F16H 2045/0205; F16H 2045/0231; F16H 2045/0263
    See application file for complete search history.

(56) References Cited

U.S. PATENT DOCUMENTS

| 6,044,942 | A | 4/2000 | Fukushima | |
| 2014/0144284 | A1* | 5/2014 | Lee | .......................... F16F 15/31 |
| | | | | 74/572.2 |
| 2014/0182415 | A1* | 7/2014 | Griesmeier | ............... F16H 3/66 |
| | | | | 74/661 |
| 2016/0153521 | A1* | 6/2016 | Tondellier | ............. F16F 15/145 |
| | | | | 74/574.2 |
| 2016/0318399 | A1* | 11/2016 | Paweletz | .................. B60K 1/04 |
| 2016/0333961 | A1* | 11/2016 | Dinger | .................. F16F 15/145 |

FOREIGN PATENT DOCUMENTS

| JP | H1182628 A | 3/1999 |
| JP | 2014145413 A | 8/2014 |
| JP | 2015094424 A | 5/2015 |

OTHER PUBLICATIONS

U.S. Appl. No. 15/576,776, filed Nov. 24, 2017, Exedy Corporation.
U.S. Appl. No. 15/576,788, filed Nov. 24, 2017, Exedy Corporation.
International Search Report dated Aug. 30, 2016 for foreign Application No. PCT/JP2016/071332, 1 pp.
International Search Report dated Aug. 30, 2016 for foreign Application No. PCT/JP2016/071503, 1 pp.
International Search Report dated Aug. 30, 2016 for corresponding foreign Application No. PCT/JP2016/071333, 1 pp.
International Search Report dated Aug. 30, 2016 for foreign Application No. PCT/JP2016/071504, 1 pp.

* cited by examiner

TORQUE FLUCTUATION INHIBITING DEVICE, TORQUE CONVERTER AND POWER TRANSMISSION DEVICE

CROSS-REFERENCES TO RELATED APPLICATIONS

This application is the U.S. National Phase of PCT International Application No. PCT/JP2016/071333, filed on Jul. 21, 2016. That application claims priority to Japanese Patent Application No. 2015-162957, filed on Aug. 20, 2015, Japanese Patent Application No. 2015-198244, filed on Oct. 6, 2015, Japanese Patent Application No. 2015-199308, filed on Oct. 7, 2015, and Japanese Patent Application No. 2015-208759, filed on Oct. 23, 2015. The contents of all five applications are herein incorporated by reference in their entirety.

BACKGROUND

Technical Field

The present disclosure relates to a torque fluctuation inhibiting device, particularly to a torque fluctuation inhibiting device for inhibiting torque fluctuations in a rotor to which a torque is inputted. Additionally, the present disclosure relates to a torque converter and a power transmission device, each of which includes the torque fluctuation inhibiting device.

Background Art

For example, a clutch device, including a damper device, and a torque converter are provided between an engine and a transmission in an automobile. Additionally, for reduction in fuel consumption, the torque converter is provided with a lock-up device that mechanically transmits a torque at a predetermined rotational speed or greater.

The lock-up device generally includes a clutch part and a damper including a plurality of torsion springs. Additionally, the clutch part includes a piston to which a friction member is attached and that is pressed onto a front cover by an action of hydraulic pressure. Then in a lock-up on state, a torque is transmitted from the front cover to the piston through the friction member, and is further transmitted therefrom to an output-side member through the plural torsion springs.

In the lock-up device described above, torque fluctuations (fluctuations in rotational velocity) are inhibited by the damper including the plural torsion springs.

Incidentally, a lock-up device described in Japan Laid-open Patent Application Publication No. 2015-094424 is provided with a dynamic damper device including an inertia member in order to inhibit torque fluctuations. The dynamic damper device described in Japan Laid-open Patent Application Publication No. 2015-094424 is attached to a plate supporting torsion springs, and includes a pair of inertia rings, which is rotatable relatively to the plate, and a plurality of coil springs disposed between the plate and the inertia rings.

BRIEF SUMMARY

A peak of torque fluctuations, occurring in a predetermined rotational speed range, can be reduced by providing the lock-up device with the dynamic damper device in Japan Laid-open Patent Application Publication No. 2015-094424.

Well-known dynamic damper devices including that of Japan Laid-open Patent Application Publication No. 2015-094424 can reduce a peak of torque fluctuations in a predetermined rotational speed range. However, when the specification of the engine or so forth is changed, a rotational speed range in which a peak of torque fluctuations appears varies in accordance therewith. Therefore, the inertia amount of the inertia rings and the spring constant of the coil springs are required to be changed in accordance with changing the specification of the engine or so forth. However, coping with such requirement may be difficult in some cases.

It is an object of the present disclosure to make it possible, in a device for inhibiting torque fluctuations in a rotary member, to reduce a peak of torque fluctuations in a relatively wide rotational speed range.

Solution to Problems (1) A torque fluctuation inhibiting device according to the present disclosure is a device for inhibiting torque fluctuations in a rotor to which a torque is inputted. The present device includes a mass body, a plurality of centrifugal elements, an actuation preventing mechanism and a cam mechanism. The mass body is disposed to be rotatable with the rotor and be rotatable relatively to the rotor. Each of the plurality of centrifugal elements is disposed to receive a centrifugal force to be generated by rotation of the rotor and the mass body, and is movable in a radial direction. The actuation preventing mechanism restricts at least one of the plurality of centrifugal elements from moving outward in the radial direction when the rotor or the mass body is rotated at a predetermined speed or greater. When a relative displacement is produced between the rotor and the mass body in a rotational direction, the cam mechanism converts the centrifugal force into a circumferential force directed to reduce the relative displacement with use of actuation of the each of the plurality of centrifugal elements moved in the radial direction by the centrifugal force.

When a torque is inputted to the rotor in this device, the rotor and the mass body are rotated by actuation of the cam mechanism. When the torque inputted to the rotor does not fluctuate, relative displacement is not produced between the rotor and the mass body in the rotational direction. Therefore, the rotor and the mass body are rotated in synchronization with each other. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, each of the plurality of centrifugal elements receives a centrifugal force and is moved in the radial direction. Then, when the relative displacement is produced between the rotor and the mass body, the cam mechanism is actuated to convert the centrifugal force acting on each of the plurality of centrifugal elements into a circumferential force with use of actuation of each of the plurality of centrifugal elements so as to reduce the relative displacement between the rotor and the mass body by the circumferential force. Torque fluctuations are inhibited by the herein described actuation of the cam mechanism. On the other hand, when the rotor or the mass body are rotated at the predetermined speed or greater, at least one of the plurality of centrifugal elements is restricted from moving outward in the radial direction. In other words, the at least one of the plurality of centrifugal elements, restricted from moving outward in the radial direction, is configured not to contribute to the actuation of the cam mechanism.

Here, the device is composed of the mass body, the plurality of centrifugal elements and the cam mechanism. Hence, these members can be disposed in radial alignment with respect to the rotor, whereby the axial space of the device can be reduced. Additionally, the centrifugal force acting on each of the plurality of centrifugal elements is utilized for inhibiting torque fluctuations. Hence, characteristics of inhibiting torque fluctuations vary in accordance with the rotational speed of the rotor. Moreover, the characteristics of inhibiting torque fluctuations can be also varied by changing the specification of the cam mechanism. Hence, a peak of torque fluctuations can be reduced in as wide a rotational speed range as possible. Furthermore, characteristics of converting the centrifugal force into the circumferential force can be suitably changed depending on the setting of the actuation preventing mechanism.

(2) Preferably, the actuation preventing mechanism includes a pin and a turn member. The pin is disposed on the rotor or the mass body on which the plurality of centrifugal elements are disposed, and extends in a direction arranged along a rotational axis direction of the rotor. The turn member is turnably supported about the pin, and includes a pawl part and a weight part. The pawl part makes contact with an outer peripheral surface of the at least one of the plurality of centrifugal elements, and is provided on one end of the turn member. The weight part is provided on the other end of the turn member. The one end and the other end are disposed circumferentially on both sides of the pin. Additionally, the weight part is turned to an outer peripheral side in conjunction with the rotation of the rotor and the mass body, and the pawl part prevents the at least one of the plurality of centrifugal elements from moving in the radial direction when the rotor or the mass body is rotated at the predetermined speed or greater.

(3) Preferably, the actuation preventing mechanism further includes an urging member that urges the turn member such that the weight part is moved to an inner peripheral side.

(4) Preferably, the mass body is disposed on an outer or inner periphery of the rotor. In this case, the rotor and the mass body are disposed in radial alignment. Hence, the axial space can be reduced.

(5) Preferably, one of the rotor and the mass body, disposed on the inner peripheral side, includes a plurality of recesses on an outer peripheral surface thereof. Additionally, the each of the plurality of centrifugal elements is accommodated in each of the plurality of recesses so as to be movable in the radial direction. Similarly to the above, the axial space of the device can be reduced in this case too.

(6) Preferably, a friction coefficient between the each of the plurality of centrifugal elements and the each of the plurality of recesses of the one of the rotor and the mass body is less than or equal to 0.1.

(7) Preferably, a friction reducing member is disposed between a lateral surface of the each of the plurality of centrifugal elements and the each of the plurality of recesses of the one of the rotor and the mass body so as to reduce friction occurring in movement of the each of the plurality of centrifugal elements, and the lateral surface of the each of the plurality of centrifugal elements is disposed along the moving direction of the each of the plurality of centrifugal elements.

(8) Preferably, the cam mechanism includes a cam follower provided on the each of the plurality of centrifugal elements, and a cam. The cam, with which the cam follower makes contact, is provided on an inner peripheral surface of the other of the rotor and the mass body that is disposed on the outer peripheral side, and has a shape making the circumferential force vary in accordance with an amount of the relative displacement between the rotor and the mass body in the rotational direction.

Here, the amount of the relative displacement between the rotor and the mass body in the rotational direction fluctuates in accordance with the magnitude of torque fluctuations in the rotor. At this time, the shape of the cam is set such that the circumferential force, into which the centrifugal force is converted, varies in accordance with the amount of the relative displacement. Hence, torque fluctuations can be inhibited as efficiently as possible.

(9) Preferably, the torque fluctuation inhibiting device further includes an urging member. The urging member is disposed inside one of the plurality of recesses, and urges one of the plurality of centrifugal elements outward in the radial direction such that the cam follower of the one of the plurality of centrifugal elements makes contact with the cam while the rotor and the mass body are not being rotated.

Here, the urging member causes the one of the plurality of centrifugal elements to constantly make contact with the cam. Therefore, it is possible to eliminate sound to be produced when the one of the plurality of centrifugal elements is separated from the cam in stop of rotation or when the one of the plurality of centrifugal elements makes contact (collides) with the cam in start of rotation.

(10) Preferably, the cam follower is a roller disposed on the outer peripheral surface of the each of the plurality of centrifugal elements.

(11) Preferably, the cam follower is a protruding part that is integrated with the each of the plurality of centrifugal elements and is provided on the outer peripheral surface of the each of the plurality of centrifugal elements.

(12) Preferably, the cam mechanism includes a cam follower, provided on the inner peripheral surface of the other of the rotor and the mass body that is disposed on the outer peripheral side, and a cam. The cam, provided on the each of the plurality of centrifugal elements, makes contact at an outer peripheral surface thereof with the cam follower, and has a shape making the circumferential force vary in accordance with the amount of the relative displacement between the rotor and the mass body in the rotational direction.

(13) Preferably, one of the rotor and the mass body, disposed on the outer peripheral side, includes a plurality of recesses on an inner peripheral surface thereof. Additionally, the each of the plurality of centrifugal elements is accommodated in each of the plurality of recesses so as to be movable in the radial direction. Preferably, the cam mechanism includes a cam follower, provided on the each of the plurality of centrifugal elements, and a cam. The cam, with which the cam follower makes contact, is provided on an inner peripheral surface of the other of the rotor and the mass body that is disposed on the inner peripheral side, and has a shape making the circumferential force vary in accordance with the amount of the relative displacement between the rotor and the mass body in the rotational direction.

(14) Preferably, the mass body has a continuous annular shape.

(15) Preferably, the mass body includes a plurality of divided mass bodies disposed in circumferential alignment and a holding member for holding the plurality of divided mass bodies in the radial direction.

(16) A torque converter according to the present disclosure is disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device configured as any of the above.

(17) Preferably, the torque fluctuation inhibiting device is disposed on the input-side rotor.

(18) Preferably, the torque fluctuation inhibiting device is disposed on the output-side rotor.

(19) Preferably, the damper includes a first damper to which the torque is inputted from the input-side rotor, a second damper outputting the torque to the output-side rotor, and an intermediate member provided between the first damper and the second damper. Additionally, the torque fluctuation inhibiting device is disposed on the intermediate member.

(20) Preferably, the damper includes a plurality of coil springs. Preferably, the torque converter further includes a float member that is rotatable relatively to the input-side rotor and the output-side rotor and supports the plurality of coil springs, and the torque fluctuation inhibiting device is disposed on the float member.

(21) A power transmission device according to the present disclosure includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

(22) Preferably, the torque fluctuation inhibiting device is disposed on the second inertia body.

(23) Preferably, the torque fluctuation inhibiting device is disposed on the first inertia body.

(24) Preferably, the damper includes a first damper to which a torque is inputted from the first inertia body, a second damper outputting the torque to the second inertia body, and an intermediate member provided between the first damper and the second damper. Additionally, the torque fluctuation inhibiting device is disposed on the intermediate member.

According to the present advancement described above, in a device for inhibiting torque fluctuations in a rotary member, a peak of torque fluctuations can be reduced in a relatively wide rotational speed range.

DETAILED DESCRIPTION OF EMBODIMENTS

Figure 1:
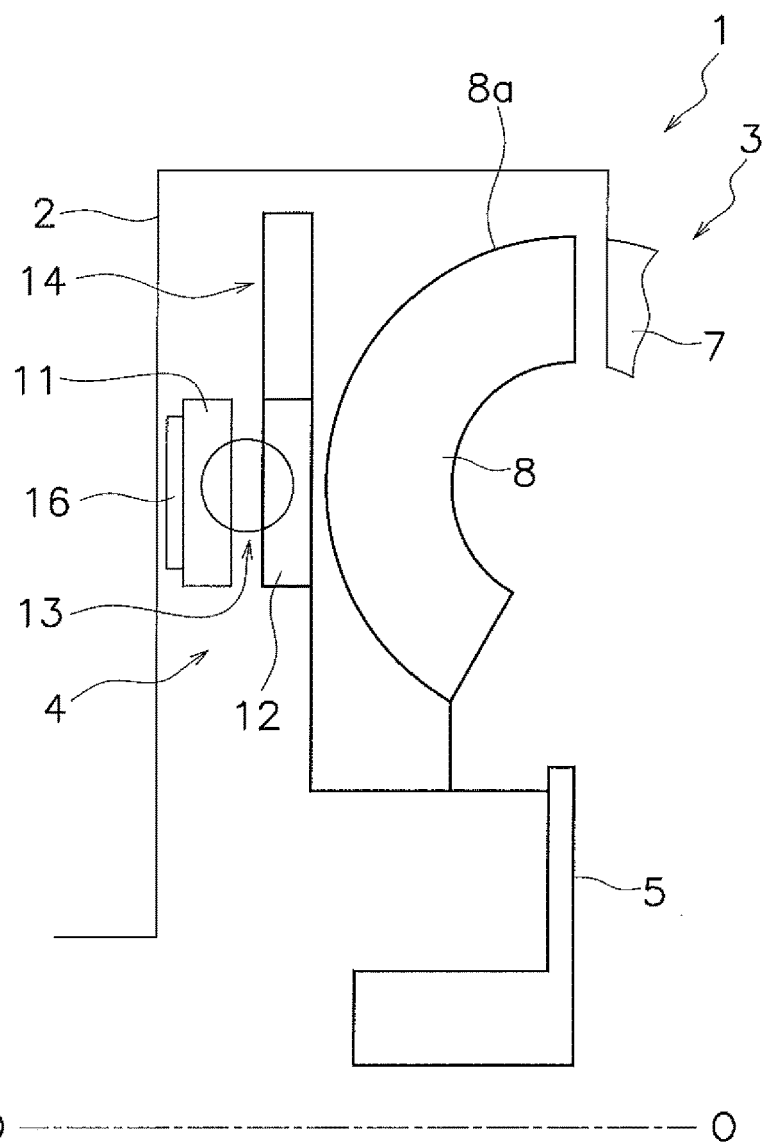
FIG. 1 is a schematic diagram of a torque converter according to an exemplary embodiment of the present disclosure.

FIG. 1 is a schematic diagram of a condition that a torque fluctuation inhibiting device according to an exemplary embodiment of the present disclosure is attached to a lock-up device for a torque converter. In FIG. 1, line O-O indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, an output-side rotor 12, a damper 13 and a torque fluctuation inhibiting device 14.

The input-side rotor 11 includes an axially movable piston, and is provided with a friction member 16 on the front cover 2-side lateral surface thereof. When the friction member 16 is pressed onto the front cover 2, the torque is transmitted from the front cover 2 to the input-side rotor 11.

The output-side rotor 12 is disposed in axial opposition to the input-side rotor 11 and is rotatable relatively to the input-side rotor 11. The output-side rotor 12 is coupled to the output hub 5.

The damper 13 is disposed between the input-side rotor 11 and the output-side rotor 12. The damper 13 includes a plurality of torsion springs and elastically couples the input-side rotor 11 and the output-side rotor 12 in a rotational direction. The damper 13 transmits the torque from the input-side rotor 11 to the output-side rotor 12, and also, absorbs and attenuates torque fluctuations.

[Torque Fluctuation Inhibiting Device 14]

Figure 2A:
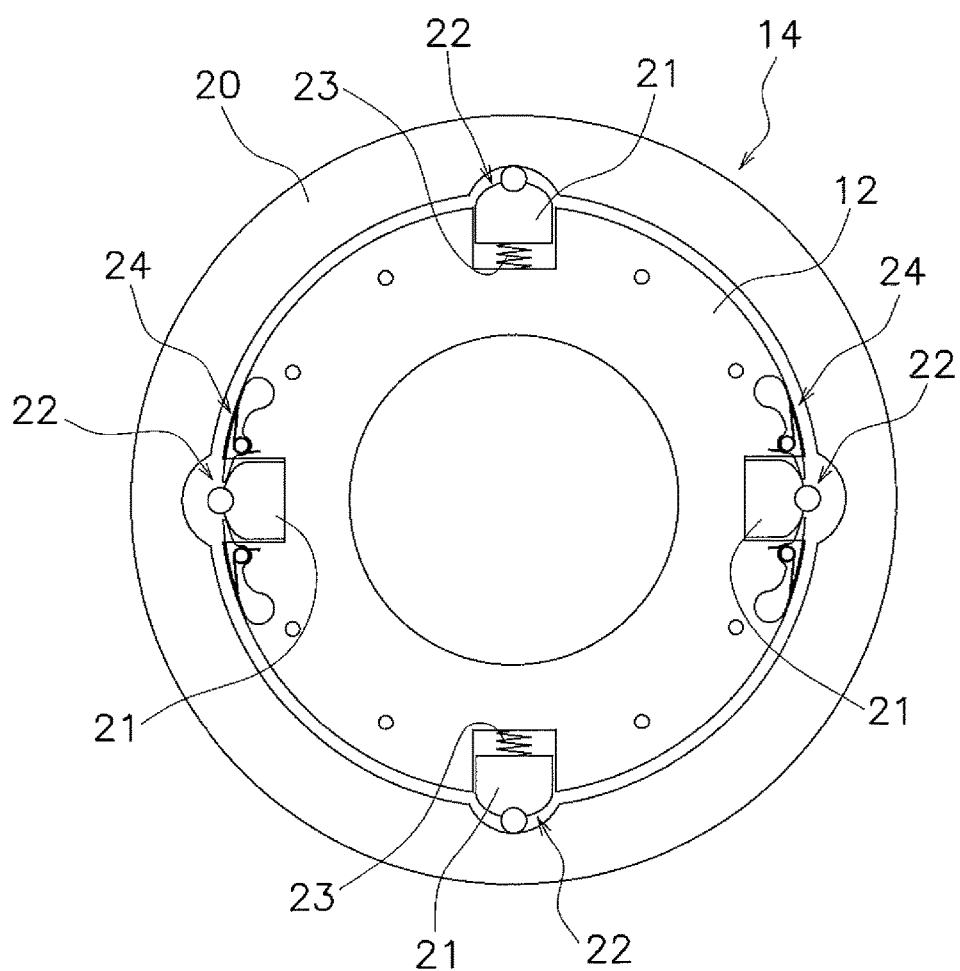
FIG. 2A is a front view of an output-side rotor and a torque fluctuation inhibiting device that are shown in FIG. 1.

FIG. 2A is a front view of the output-side rotor 12 and the torque fluctuation inhibiting device 14. As shown in FIG. 2A, the torque fluctuation inhibiting device 14 includes an inertia ring 20, four centrifugal elements 21, four cam mechanisms 22, two coil springs 23 and two actuation preventing mechanisms 24. The four centrifugal elements 21 and the four cam mechanisms 22 are disposed circumferentially at equal angular intervals of 90 degrees, respectively, whereas the two coil springs 23 and the two actuation preventing mechanisms 24 are disposed circumferentially at equal angular intervals of 180 degrees, respectively.

Figure 2B:
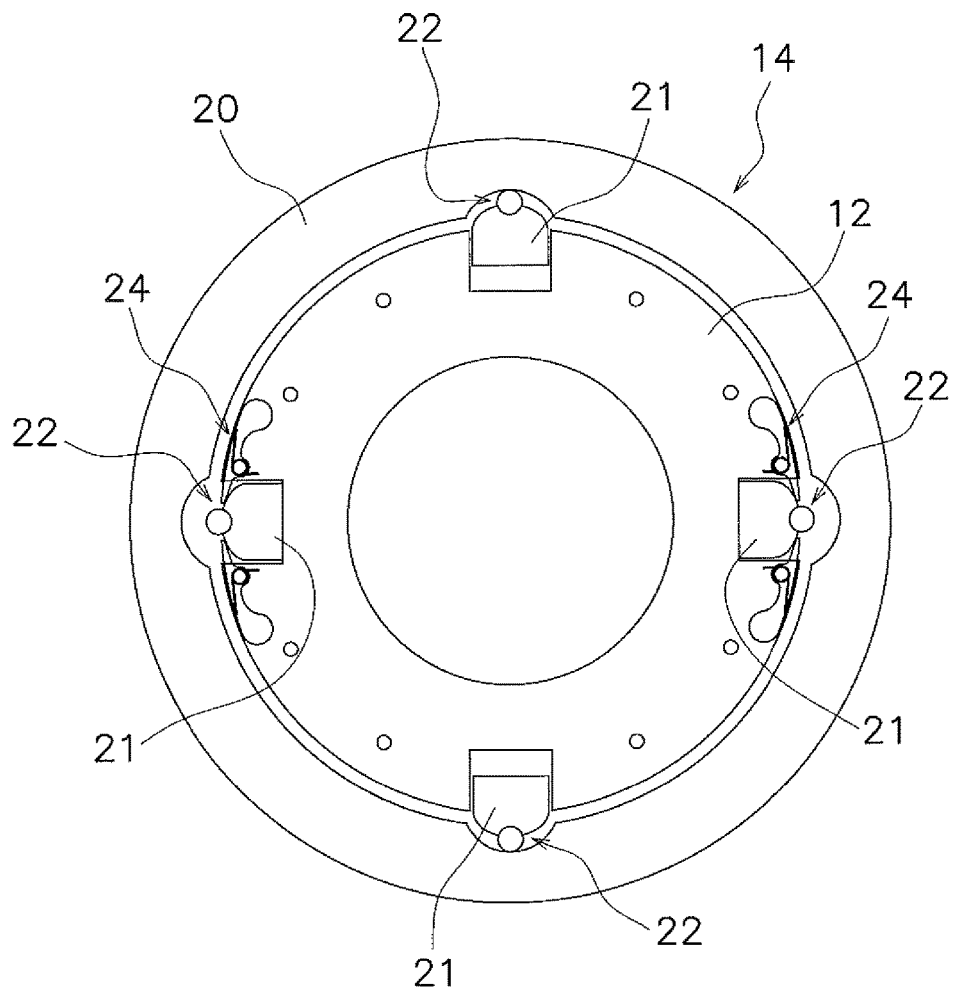
FIG. 2B is a diagram according to another exemplary embodiment and corresponds to FIG. 2A.

It should be noted that alternatively, the coil springs 23, disposed on the inner peripheral side of the centrifugal elements 21, respectively, can be omitted as shown in FIG. 2B. Likewise, the coil springs 23 can be provided or omitted in respective examples to be hereinafter explained.

The inertia ring 20 is a continuous annular plate with a predetermined thickness, and is disposed on the outer peripheral side of the output-side rotor 12 such that a predetermined gap is produced radially between the inertia ring 20 and the output-side rotor 12. In other words, the inertia ring 20 is disposed axially in the same position as the output-side rotor 12. Additionally, the inertia ring 20 has a rotational axis, which is the same as that of the output-side rotor 12. The inertia ring 20 is rotatable with the output-side rotor 12, and is also rotatable relatively thereto.

The centrifugal elements 21 are disposed in the output-side rotor 12, and are movable radially outside by centrifugal forces to be generated by rotation of the output-side rotor 12. More detailedly, as shown close-up in FIG. 3, the output-side rotor 12 includes recesses 12a on the outer peripheral surface thereof. Each recess 12a is recessed in a rectangular shape from the outer peripheral surface of the output-side rotor 12 toward a rotational center located on the inner peripheral side. Additionally, the centrifugal elements 21 are inserted into the recesses 12a, respectively, and are radially movable therein. The centrifugal elements 21 and the recesses 12a are constructed such that a friction coefficient between the lateral surfaces of each centrifugal element 21 and each recess 12a is set to be less than or equal to 0.1. Moreover, each centrifugal element 21 is a plate having approximately the same thickness as the output-side rotor 12, and includes an outer peripheral surface 21a having a circular-arc shape. Additionally, each centrifugal element 21 includes a roller accommodation part 21b recessed inside from the outer peripheral surface 21a.

Figure 3:
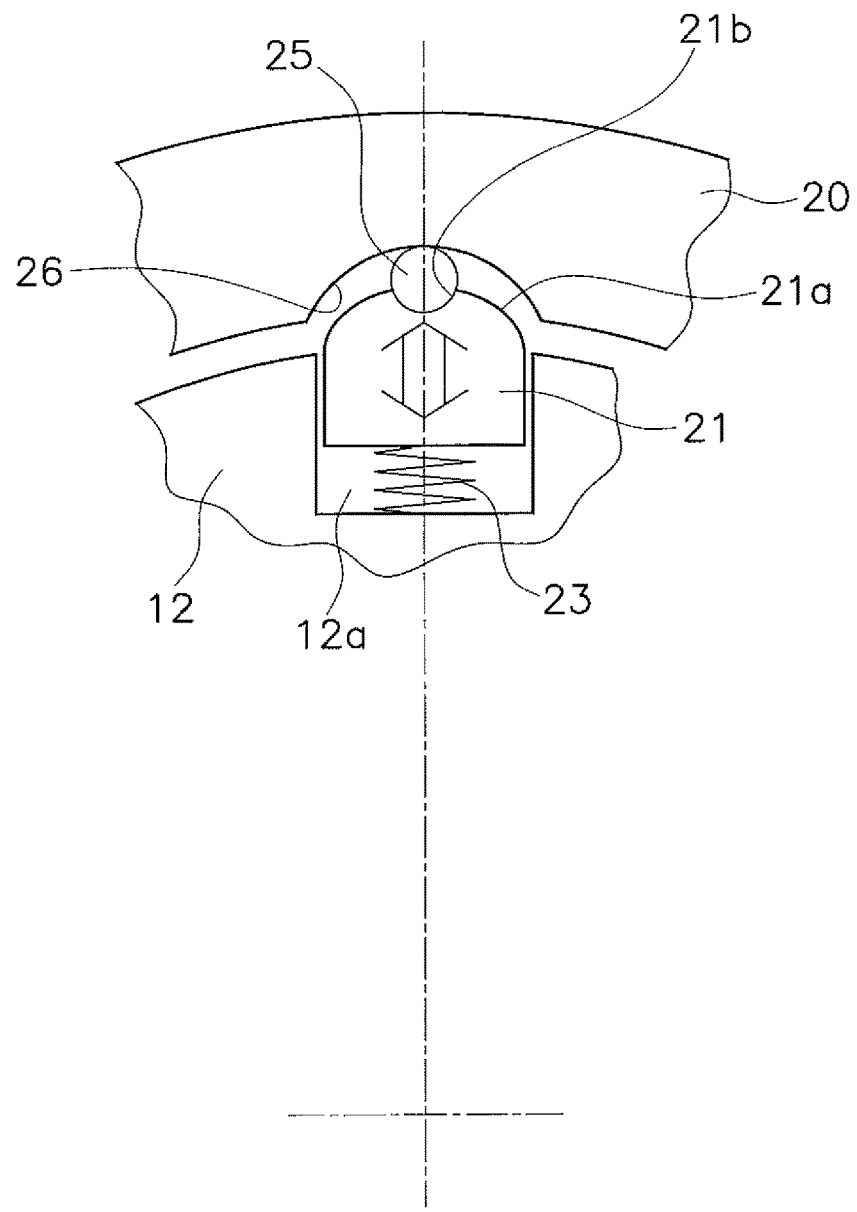
FIG. 3 is a partial enlarged view of FIG. 2A.

As shown in FIG. 3, each cam mechanism 22 is composed of a roller 25 as a cam follower and a cam 26 provided on the inner peripheral surface of the inertia ring 20. The roller 25 is attached to the roller accommodation part 21b of each centrifugal element 21, and is radially movable together with each centrifugal element 21. It should be noted that the roller 25 can be rotatable in or fixed to the roller accommodation part 21b. The cam 26 is a circular-arc surface with which the roller 25 makes contact. The roller 25 is moved along the cam 26 when the output-side rotor 12 and the inertia ring 20 are rotated relatively to each other in a predetermined angular range.

Although described below in detail, when rotational phase difference is produced between the output-side rotor 12 and the inertia ring 20 by the contact between each roller 25 and each cam 26, a centrifugal force generated in each centrifugal element 21 and each roller 25 is converted into a circumferential force by which the rotational phase difference is reduced.

Each coil spring 23 is disposed between the bottom surface of its corresponding recess 12a and the inner peripheral side surface of its corresponding centrifugal element 21, and urges its corresponding centrifugal element 21 to the outer peripheral side. The corresponding centrifugal element 21 and the corresponding roller 25 are pressed onto the corresponding cam 26 of the inertia ring 20 by the urging force of each coil spring 23. Therefore, the corresponding roller 25 makes contact with the corresponding cam 26 even when a centrifugal force does not act on the corresponding centrifugal element 21 in a condition that the output-side rotor 12 is not being rotated.

As described above, the actuation preventing mechanisms 24 are disposed in opposition through the rotational axis. In other words, the actuation preventing mechanisms 24 restrict radial movement of opposed two of the four centrifugal elements 21, and besides, restrict actuation of their corresponding cam mechanisms 22.

Figure 4A:
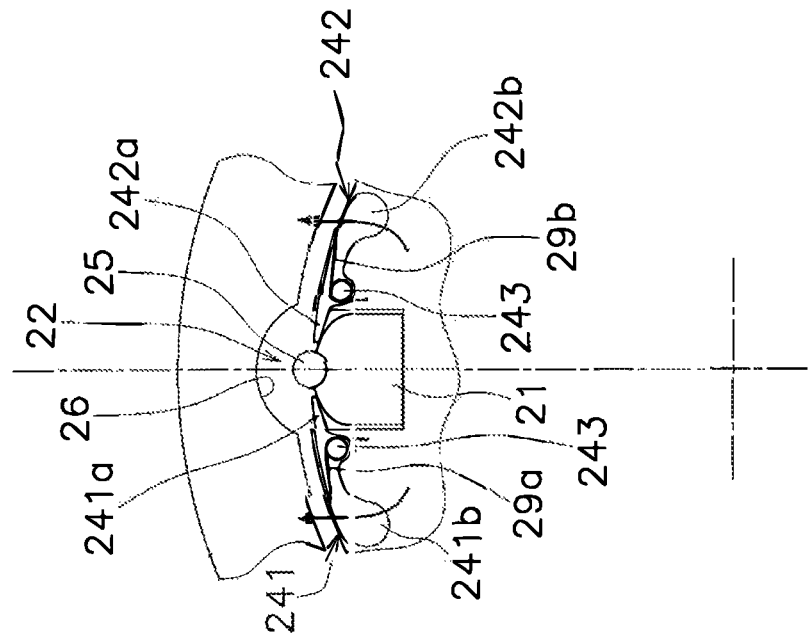
FIGS. 4(a) and 4(b) are diagrams showing the configuration and the actuation of an actuation preventing mechanism.
Figure 4B:
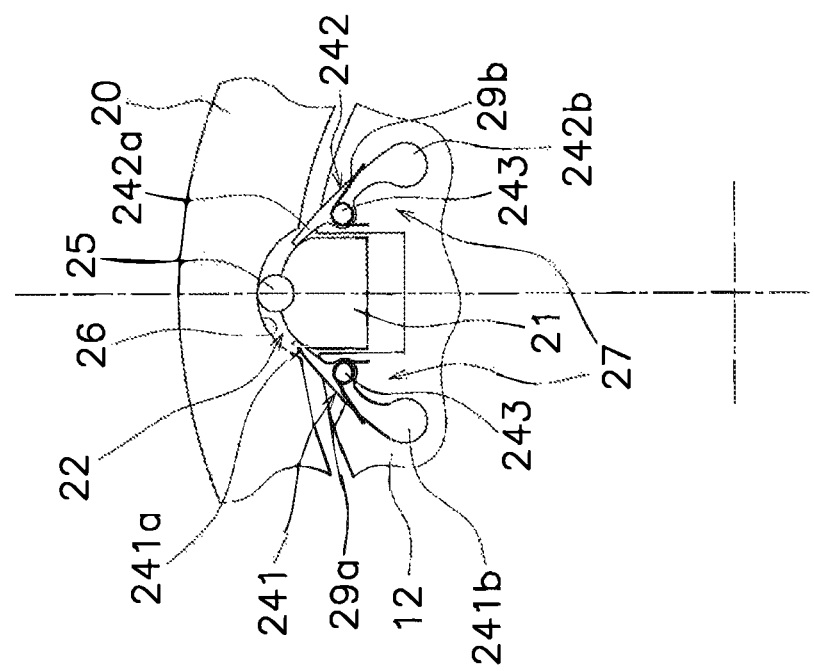

As shown close-up in FIGS. 4(a) and 4(b), each actuation preventing mechanism 24 includes a pair of turn members 241 and 242, torsion springs 29a and 29b for holding the pair of turn members 241 and 242 in actuation allowed postures shown in FIG. 4(a), and pins 243. The pair of turn members 241 and 242 is disposed such that their corresponding centrifugal element 21 is circumferentially interposed therebetween. The pair of turn members 241 and 242 is disposed to be symmetric to each other with respect to the corresponding centrifugal element 21.

The turn member 241, which is one of the pair of turn members, is turnably supported by one of the pins 243 fixed to the output-side rotor 12. In other words, the turn member 241 is turnable about the pin 243 in parallel to the lateral surface of the output-side rotor 12. The turn member 241 includes a pawl part 241a on the centrifugal element 21 side of the pin 243 and includes a weight part 241b on the opposite side of the pawl part 241a. The length of the pawl part 241a is set such that the pawl part 241a is capable of making contact with the outer peripheral surface of the corresponding centrifugal element 21. Additionally, the turn member 242, which is the other of the pair of turn members, also has a configuration similar to the above, and includes a pawl part 242a and a weight part 242b.

When external forces (centrifugal forces by rotation) are not acting on the pair of turn members 241 and 242, the pair of turn members 241 and 242 are held in the allowed postures as shown in FIG. 4(a) by the torsion springs 29a and 29b. In other words, the pawl parts 241a and 242a of the pair of turn members 241 and 242 are directed to the outer peripheral side, and the corresponding centrifugal element 21 is freely movable in the radial direction.

On the other hand, when the output-side rotor 12 is rotated at a predetermined speed or greater, the centrifugal forces acting on the weight parts 241b and 242b of the pair of turn members 241 and 242 become greater than the centrifugal force acting on the corresponding centrifugal element 21 and the holding forces of the torsion springs 29a and 29b. In this case, as shown in FIG. 4(b), the weight parts 241b and 242b of the pair of turn members 241 and 242 are moved to the outer peripheral side, whereas the pawl parts 241a and 242a of the pair of turn members 241 and 242 are moved to the inner peripheral side. In such a condition, radial movement of the corresponding centrifugal element 21 is prevented by the pawl parts 241a and 242a. Therefore, the roller 25, provided as a cam follower on the corresponding centrifugal element 21, can no longer make contact with the corresponding cam 26, whereby the corresponding cam mechanism 22 is no longer actuated.

[Actuation of Cam Mechanisms 22]

Actuation of each cam mechanism 22 (inhibition of torque fluctuations) will be explained with FIGS. 3 and 5. In the lock-up on state, a torque transmitted to the front cover 2 is transmitted to the output-side rotor 12 through the input-side rotor 11 and the damper 13.

When torque fluctuations do not exist in transmitting a torque, the output-side rotor 12 and the inertia ring 20 are rotated in the condition shown in FIG. 3. In other words, the roller 25 in each cam mechanism 22 is contacted to the deepest position (the circumferential middle position) of the cam 26, and the rotational phase difference between the output-side rotor 12 and the inertia ring 20 is "0".

As described above, the rotation-directional relative displacement between the output-side rotor 12 and the inertia ring 20 is referred to as "rotational phase difference". In FIGS. 3 and 5, this indicates displacement between the circumferential middle position of each centrifugal element 21 and each roller 25 and that of each cam 26.

Figure 5:
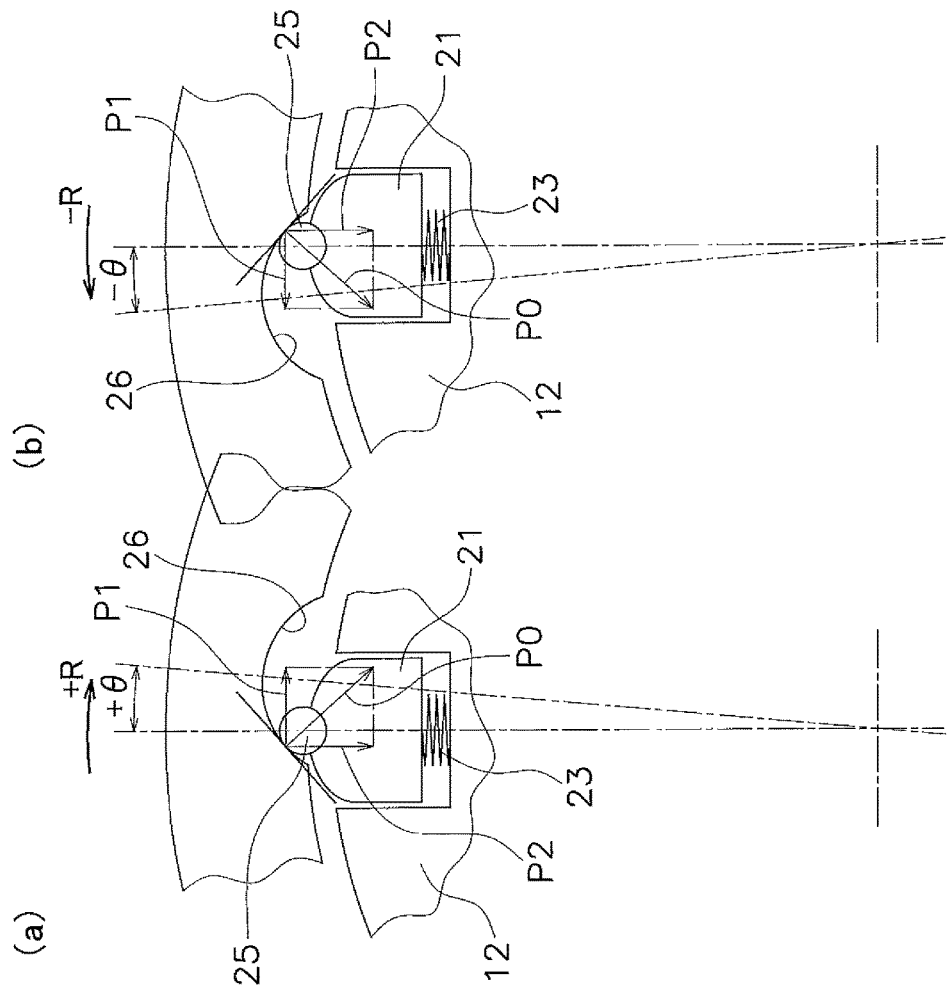
FIG. 5 is a diagram for explaining the actuation of a cam mechanism.

On the other hand, when torque fluctuations exist in transmitting a torque, rotational phase difference ±θ is produced between the output-side rotor 12 and the inertia ring 20 as shown in diagrams (a) and (b) of FIG. 5. FIG. 5(a) shows a condition that rotational phase difference +θ is produced to a +R side, whereas FIG. 5(b) shows a condition that rotational phase difference −θ is produced to a −R side.

As shown in FIG. 5(a), when the rotational phase difference +θ is produced between the output-side rotor 12 and the inertia ring 20, the roller 25 of each cam mechanism 22 is relatively moved along the cam 26 to the left side in FIG. 5. At this time, a centrifugal force acts on the centrifugal element 21 and the roller 25. Hence, a reaction force to be received by the roller 25 from the cam 26 has a direction and a magnitude indicated by P0 in FIG. 5(a). A first force component P1 and a second force component P2 are produced by the reaction force P0. The first force component P1 is directed in the circumferential direction, whereas the second force component P2 is directed to move the centrifugal element 21 and the roller 25 toward the rotational center.

Additionally, the first force component P1 acts as a force to move the output-side rotor 12 to the rightward in FIG. 5(a) through each cam mechanism 22. In other words, a force directed to reduce the rotational phase difference between the output-side rotor 12 and the inertia ring 20 is supposed to act on the output-side rotor 12. On the other hand, the second force component P2 moves the centrifugal element 21 and the roller 25 to the radially inner peripheral side against the urging force of the coil spring 23.

FIG. 5(b) shows a condition that the rotational phase difference −θ is produced between the output-side rotor 12 and the inertia ring 20. FIG. 5(b) is similar to FIG. 5(a) regarding the actuation of each cam mechanism 22, although FIG. 5(b) is different from FIG. 5(a) only regarding the moving direction of the roller 25 of each cam mechanism 22 and the directions of the reaction force P0, the first force component P1 and the second force component P2.

Incidentally, when the output-side rotor 12 is rotated at less than the predetermined speed, the two cam mechanisms 22, which are located in the parts that the actuation preventing mechanisms 24 are provided, are actuated as described above. However, when the output-side rotor 12 is rotated at the predetermined speed or greater, only the cam mechanisms 22, which are located in the parts that the actuation preventing mechanisms 24 are not provided, are actuated whereas the other two cam mechanisms 22 actuated as described above are no longer actuated.

As described above, when rotational phase difference is produced between the output-side rotor 12 and the inertia ring 20 by torque fluctuations, the output-side rotor 12 receives a force (first force component P1) directed to reduce the rotational phase difference between the both by the centrifugal force acting on each centrifugal element 21 and the working of each cam mechanism 22. Torque fluctuations are inhibited by this force.

The aforementioned force to inhibit torque fluctuations varies in accordance with the centrifugal force, in other words, the rotational speed of the output-side rotor 12, and also varies in accordance with the rotational phase difference and the shape of each cam 26. Therefore, by suitably setting the shape of each cam 26, characteristics of the torque fluctuation inhibiting device 14 can be made optimal in accordance with the specification of the engine and so forth.

For example, each cam 26 can be made in a shape that makes the first force component P1 linearly vary in accordance with the rotational phase difference in a condition where the centrifugal force acting is constant. Alternatively, each cam 26 can be made in a shape that makes the first force component P1 non-linearly vary in accordance with the rotational phase difference.

Additionally, when the specification of each actuation preventing mechanism 24 (especially, the shapes of the turn members 241 and 242) is suitably set, torque fluctuations can be effectively inhibited in accordance with a variety of specifications of the engine and so forth.

[Exemplary Characteristics]

Figure 6:
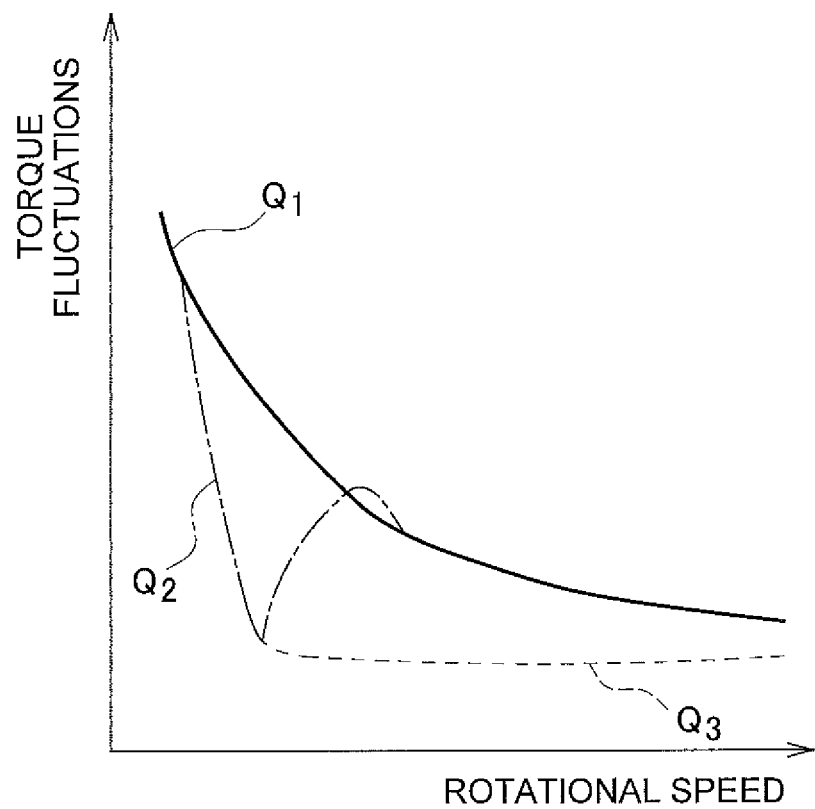
FIG. 6 is a characteristic diagram showing a relation between rotational speed and torque fluctuations.

FIG. 6 is a diagram showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present exemplary embodiment.

As is obvious from FIG. 6, in an apparatus in which the well-known dynamic damper device is installed (characteristic Q2), torque fluctuations can be inhibited only in a specific rotational speed range. By contrast, in the present exemplary embodiment (characteristic Q3), torque fluctuations can be inhibited through the entire rotational speed ranges.

[Modifications of Cam Mechanisms 22]

(Modification 1)

Figure 7:
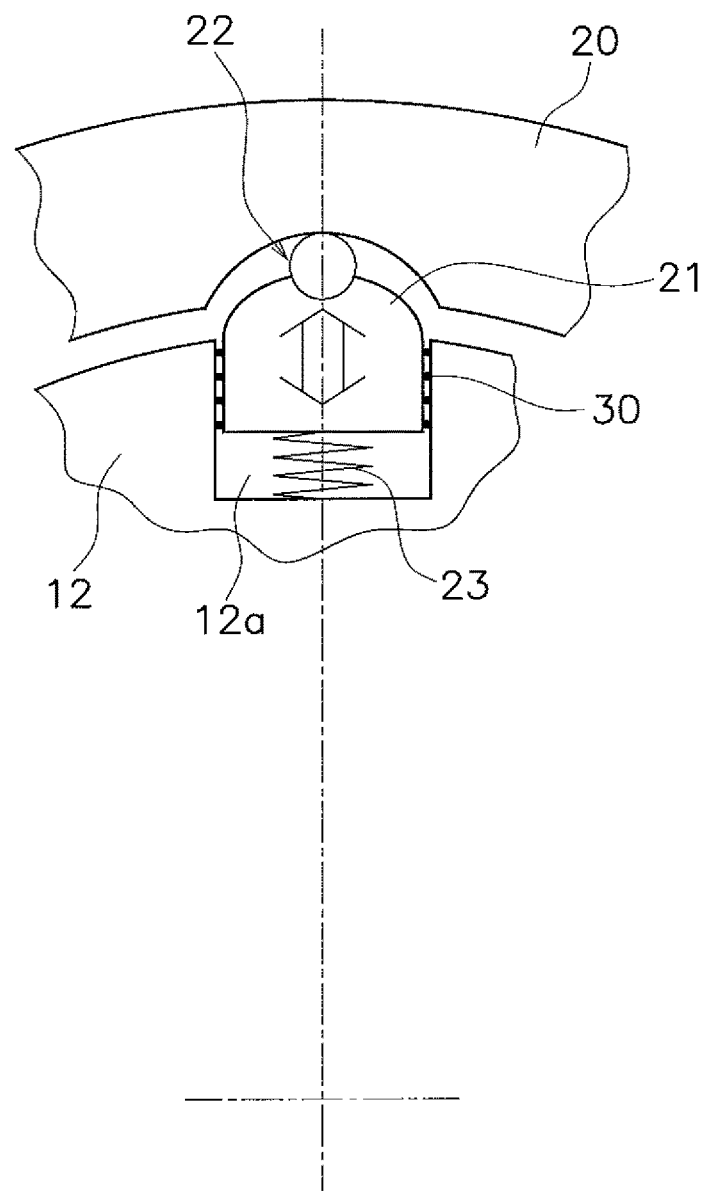
FIG. 7 is a diagram of a cam mechanism according to modification 1 and corresponds to FIG. 3.

In an exemplary embodiment shown in FIG. 7, at least one friction reducing member 30, taking the form of a bearing, a roller, a resin race, a sheet or so forth, is disposed between each centrifugal element 21 and the lateral surfaces (circumferential end surfaces) of each recess 12a. When moved, each centrifugal element 21 can be moved as smoothly as possibly by disposing the friction reducing member 30 configured as described above.

(Modification 2)

Figure 8:
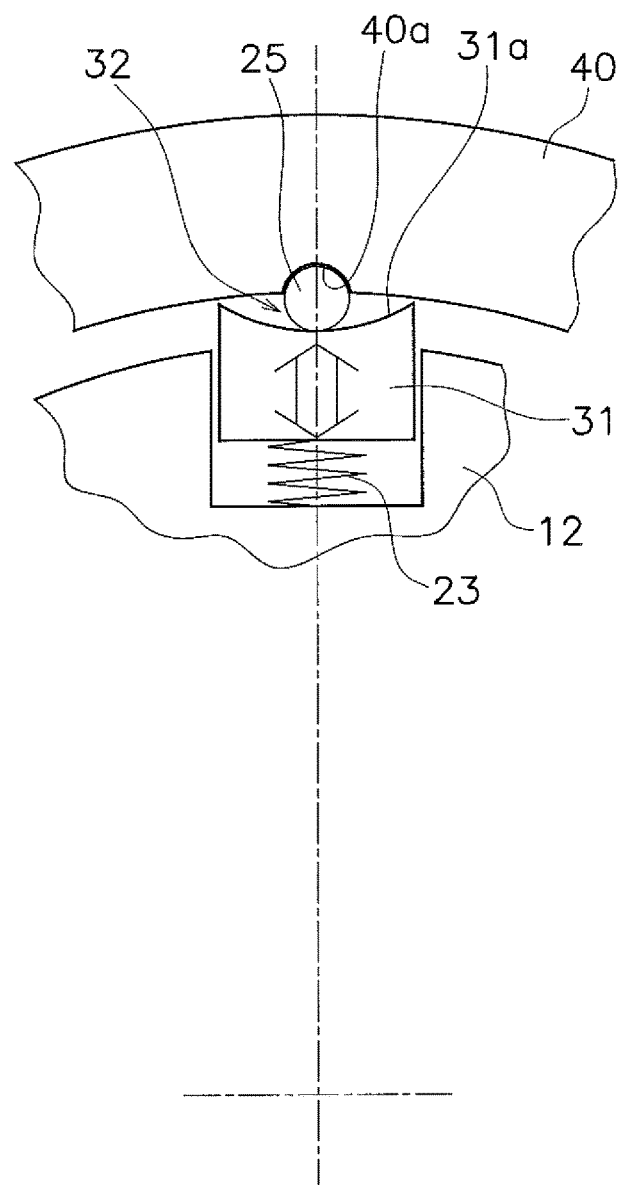
FIG. 8 is a diagram of a cam mechanism according to modification 2 and corresponds to FIG. 3.

In an exemplary embodiment shown in FIG. 8, the shape of each centrifugal element and that of the inertia ring are different from those in the aforementioned exemplary embodiment. In other words, an outer peripheral surface 31*a* of each centrifugal element 31 is made in the shape of a circular arc recessed to the inner peripheral side. This outer peripheral surface 31*a* functions as a cam. On the other hand, an inertia ring 40 includes roller accommodation parts 40*a* on the inner peripheral surface thereof. Each roller accommodation part 40*a* accommodates each roller 25 functioning as a cam follower. Additionally, each roller 25 makes contact with each outer peripheral surface 31*a* functioning as a cam.

This exemplary embodiment is different from the aforementioned exemplary embodiment regarding that each roller 25, functioning as a cam follower of each cam mechanism 32 not provided with the actuation preventing mechanism 24, is disposed on the inertia ring 40 whereas the cam 31*a* is provided on each centrifugal element 31, although this exemplary embodiment is similar to the aforementioned exemplary embodiment regarding the other configurations and actuation.

(Modification 3)

Figure 9:
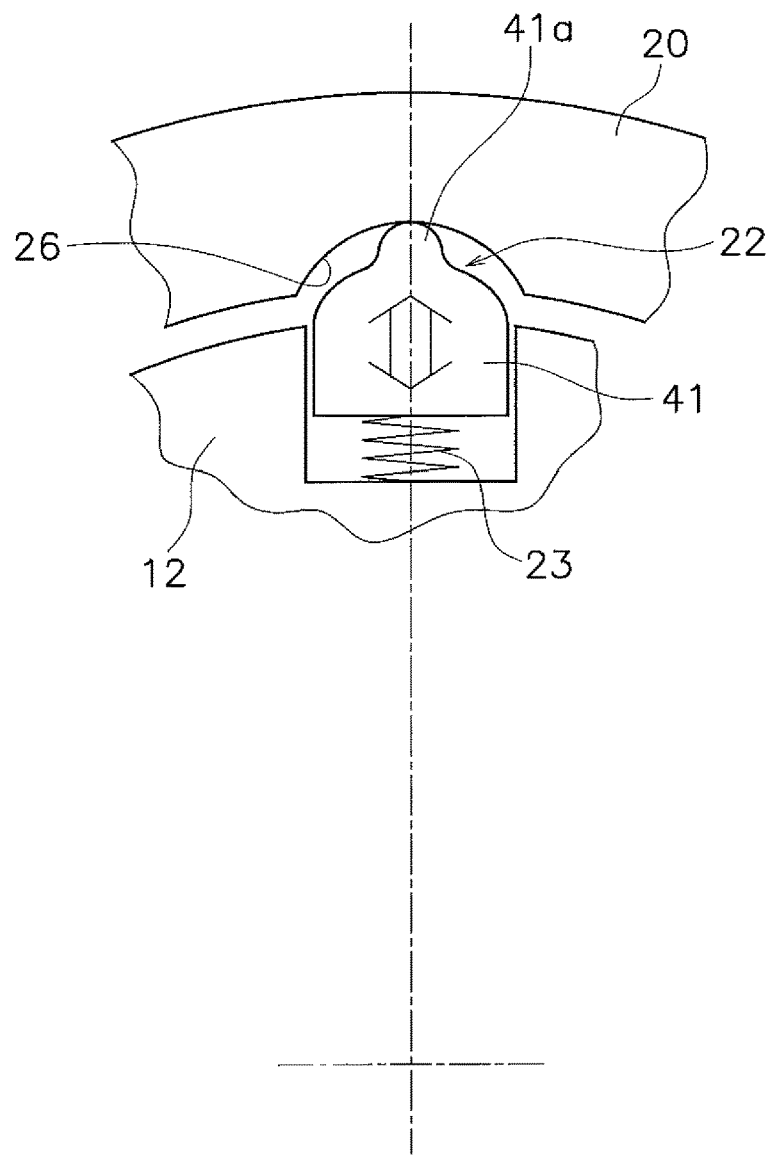
FIG. 9 is a diagram of a cam mechanism according to modification 3 and corresponds to FIG. 3.

FIG. 9 shows an example that the cam follower of each cam mechanism is integrated with each centrifugal element. In other words, each centrifugal element 41 includes a protrusion 41*a* on the outer peripheral surface thereof. The protrusion 41*a* has a semicircular shape and protrudes to the outer peripheral side. The protrusion 41*a* functions as a cam follower and makes contact with each cam 26 provided on the inertia ring 20, whereby a similar actuation to the aforementioned exemplary embodiment is made.

(Modification 4)

Figure 10:
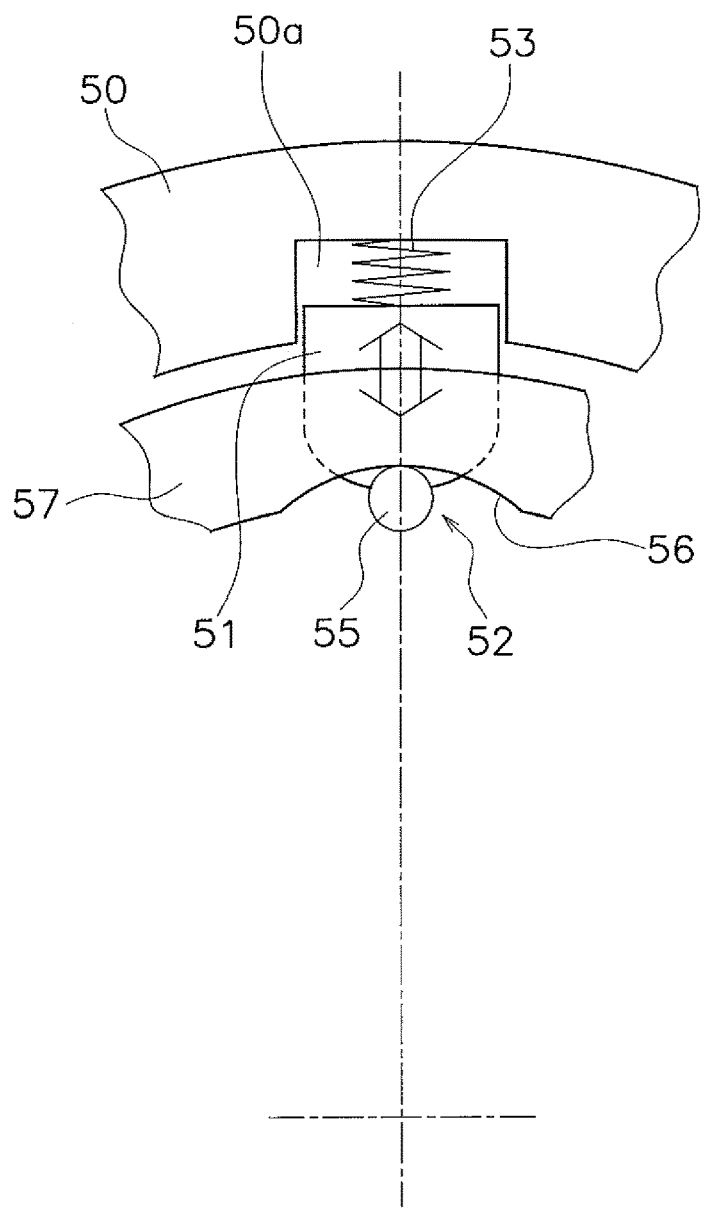
FIG. 10 is a diagram of a cam mechanism according to modification 4 and corresponds to FIG. 3.

FIG. 10 is different from the aforementioned exemplary embodiment regarding the configuration of each cam mechanism not provided with the actuation preventing mechanism 24. Specifically, in this example, centrifugal elements are disposed on the inertia ring side whereas the cam mechanisms are disposed on the inner peripheral surface of the output-side rotor. An inertia ring 50 includes recesses 50*a* having a rectangular shape on the inner peripheral surface thereof, and centrifugal elements 51 are disposed in the recesses 50*a*, respectively, so as to be movable in the radial direction. Additionally, a tension spring 53, pulling each centrifugal element 51 to the outer peripheral side, is provided between each centrifugal element 51 and the bottom surface of each recess 50*a*.

On the other hand, each cam mechanism 52 is composed of a roller 55 and a cam 56. The roller 55 is provided as a cam follower on the tip (inner peripheral end) of each centrifugal element 51, whereas the cam 56 is provided on the inner peripheral surface of an output-side rotor 57. The shape of the cam 56 is similar to that of the cam in the aforementioned exemplary embodiment. The roller 55 is constantly contacted to the cam 56 by the urging force of the tension spring 53.

In this exemplary embodiment, when the inertia ring 50 is rotated together with the output-side rotor 57, a centrifugal force directed to the outer peripheral side is generated in each centrifugal element 51. The roller 55 is pressed onto the cam 56 by the centrifugal force. Additionally in occurrence of torque fluctuations, a similar action to the aforementioned exemplary embodiment is made.

[Other Exemplary Embodiments]

The present disclosure is not limited to the exemplary embodiment described above, and a variety of changes or modifications can be made without departing from the scope of the present disclosure.

Figure 11:
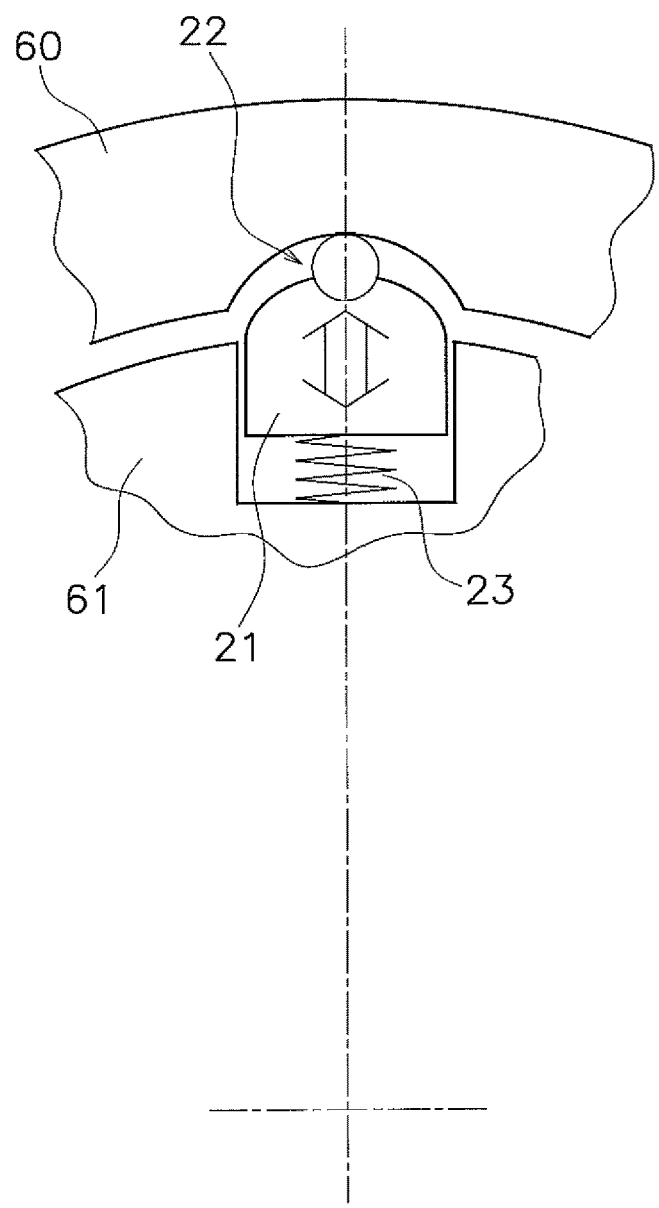
FIG. 11 is a diagram showing another exemplary embodiment of the present disclosure and corresponds to FIG. 3.

(a) The positional relation between the output-side rotor and the inertia ring is not limited to the aforementioned exemplary embodiment. For example, as shown in FIG. 11, contrarily to the aforementioned exemplary embodiment, an output-side rotor 60 can be disposed on the outer peripheral side, whereas an inertia ring 61 can be disposed on the inner peripheral side. The other configurations including the cam mechanisms 22 and so forth are similar to those in the aforementioned exemplary embodiment.

Figure 12:
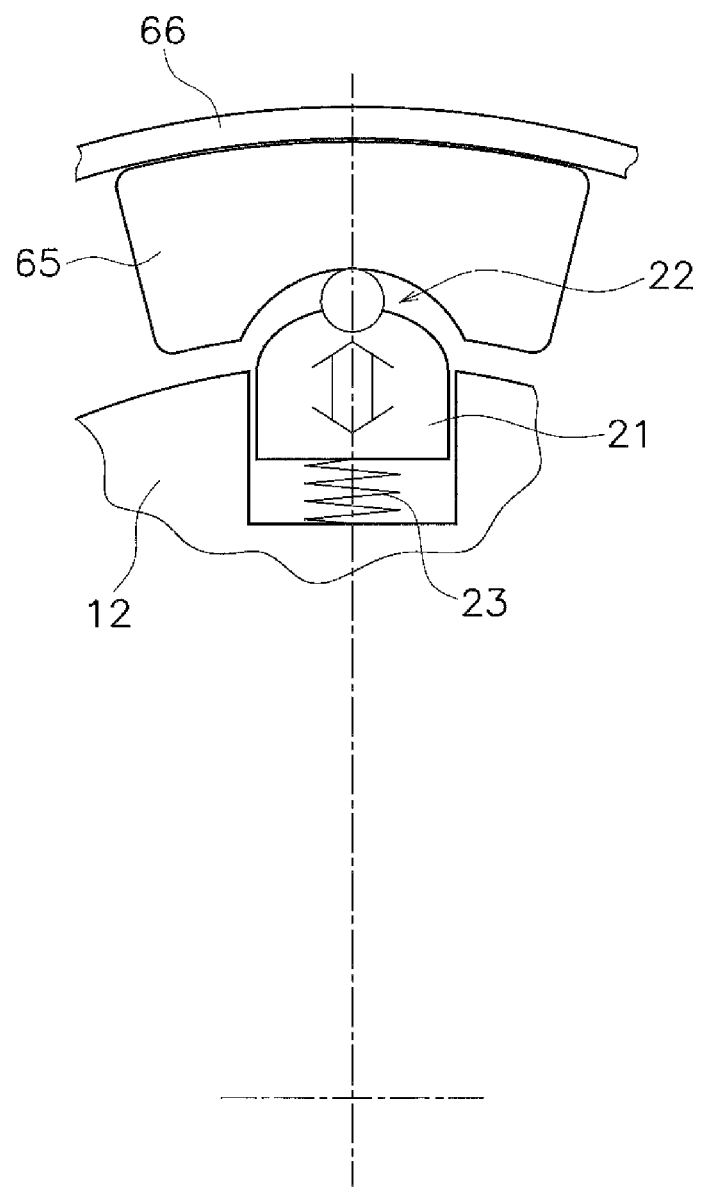
FIG. 12 is a diagram showing yet another exemplary embodiment of the present disclosure and corresponds to FIG. 3.

(b) In the aforementioned exemplary embodiment, the inertia ring is composed of a continuous annular member. However, as shown in FIG. 12, a plurality of inertia bodies 65 divided from each other can be disposed in circumferential alignment. In this case, for the purpose of holding the plural inertia bodies 65, a holding member such as a holding ring 66 having an annular shape is required to be provided on the outer peripheral side of the inertia bodies 65.

Figure 13:
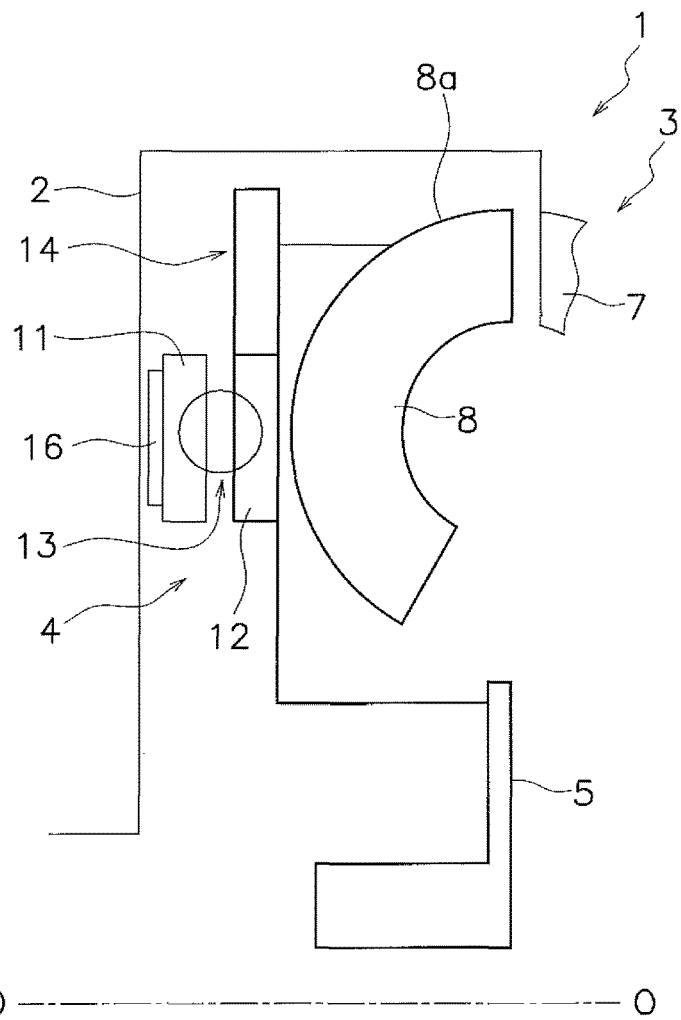
FIG. 13 is a diagram showing further yet another exemplary embodiment of the present disclosure and corresponds to FIG. 1.

(c) As shown in FIG. 13, an inertia ring, composing the torque fluctuation inhibiting device 14, can be configured to be coupled to the turbine 8. In this case, the turbine 8 is not coupled to the output hub 5. The inertia ring is herein coupled to the turbine 8 (exactly speaking, a turbine shell 8*a*), and hence, the turbine shell 8*a* also functions as an inertia element (an inertia body) together with the inertia ring.

It should be noted that in an exemplary embodiment shown in FIG. 13, when the lock-up off state is made, a torque from the torque converter body 3 is transmitted from the torque fluctuation inhibiting device 14 to the output-side rotor 12 through the turbine 8, and is then outputted to the output hub 5. At this time, it is difficult to transmit a torque (not torque fluctuations but steady average torque) from the inertia ring to the output-side rotor 12 through the cam mechanisms. Therefore, it is required to reliably produce an angular range in which each of the cam mechanisms is actuated, and besides, it is required to produce a configuration to transmit a torque with springs, mechanical stoppers or so forth.

[Application Examples]

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 14:
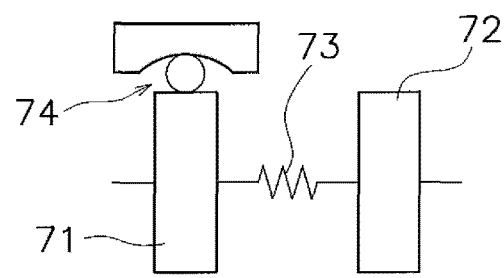
FIG. 14 is a schematic diagram showing application example 1 of the present disclosure.

(a) FIG. 14 is a diagram schematically showing a torque converter. The torque converter includes an input-side rotor 71, an output-side rotor 72 and a damper 73 disposed between both rotors 71 and 72. The input-side rotor 71 includes members such as a front cover, a drive plate and a piston. The output-side rotor 72 includes a driven plate and a turbine hub. The damper 73 includes a plurality of torsion springs.

In the example shown in FIG. 14, a centrifugal element is provided on any of the members composing the input-side rotor 71, and a cam mechanism 74 is provided to be actuated with use of a centrifugal force acting on the centrifugal element. A configuration applicable to the cam mechanism 74 is similar to that in the aforementioned respective exemplary embodiments.

Figure 15:
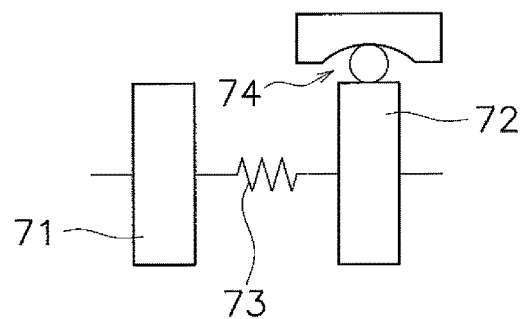
FIG. 15 is a schematic diagram showing application example 2 of the present disclosure.

(2) In a torque converter shown in FIG. 15, a centrifugal element is provided on any of the members composing the output-side rotor 72, and the cam mechanism 74 is provided to be actuated with use of a centrifugal force acting on the centrifugal element. A configuration applicable to the cam mechanism 74 is similar to that in the aforementioned respective exemplary embodiments.

Figure 16:
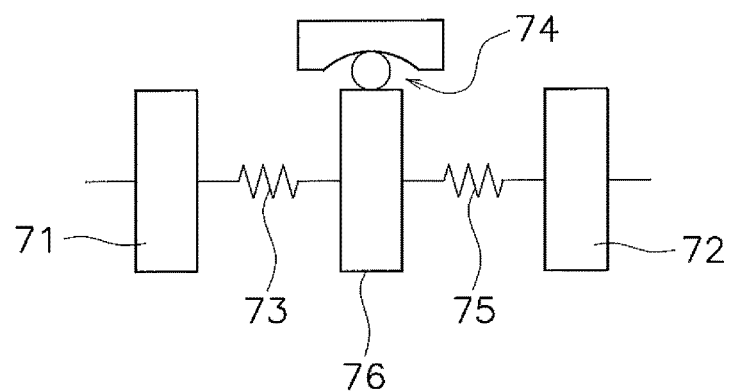
FIG. 16 is a schematic diagram showing application example 3 of the present disclosure.

(3) A torque converter shown in FIG. 16 includes another damper 75 and an intermediate member 76 provided between the two dampers 73 and 75 in addition to the configurations shown in FIGS. 14 and 15. The intermediate member 76 is rotatable relatively to the input-side rotor 71 and the output-side rotor 72, and makes the two dampers 73 and 75 act in series.

In the example shown in FIG. 16, a centrifugal element is provided on the intermediate member 76, and the cam mechanism 74 is provided to be actuated with use of a centrifugal force acting on the centrifugal element. A configuration applicable to the cam mechanism 74 is similar to that in the aforementioned respective exemplary embodiments.

Figure 17:
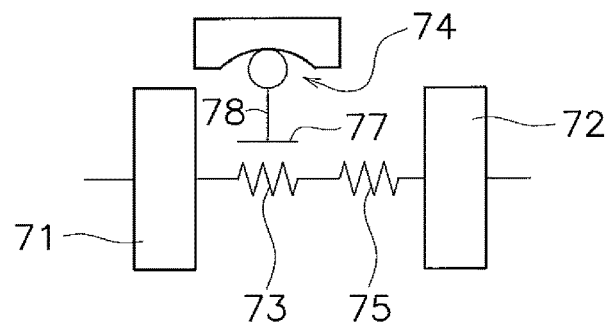
FIG. 17 is a schematic diagram showing application example 4 of the present disclosure.

(4) A torque converter shown in FIG. 17 includes a float member 77. The float member 77 is a member for supporting at least one torsion spring composing the damper 73. For example, the float member 77 has an annular shape and is disposed to cover the at least one torsion spring from the outer peripheral side and at least one lateral side. Additionally, the float member 77 is rotatable relatively to the input-side rotor 71 and the output-side rotor 72, and is rotated together with the damper 73 by friction with the at least one torsion spring of the damper 73. In other words, the float member 77 is also rotated.

In the example shown in FIG. 17, a centrifugal element 78 is provided on the float member 77, and the cam mechanism 74 is provided to be actuated with use of a centrifugal force acting on the centrifugal element 78. A configuration applicable to the cam mechanism 74 is similar to that in the aforementioned respective exemplary embodiments.

Figure 18:
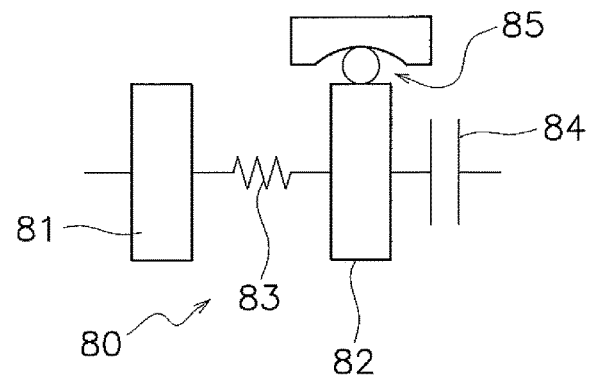
FIG. 18 is a schematic diagram showing application example 5 of the present disclosure.

(5) FIG. 18 is a schematic diagram of a power transmission device that includes a flywheel 80, composed of two inertia bodies 81 and 82, and a clutch device 84. In other words, the flywheel 80, disposed between the engine and the clutch device 84, includes the first inertia body 81, the second inertia body 82 and a damper 83. The second inertia body 82 is disposed to be rotatable relatively to the first inertia body 81. The damper 83 is disposed between the two inertia bodies 81 and 82. It should be noted that the second inertia body 82 includes a clutch cover composing the clutch device 84 as one of the constituent members thereof.

In the example shown in FIG. 18, a centrifugal element is provided on any of the rotary members composing the second inertia body 82, and a cam mechanism 85 is provided to be actuated with use of a centrifugal force acting on the centrifugal element. A configuration applicable to the cam mechanism 85 is similar to that in the aforementioned respective exemplary embodiments.

Figure 19:
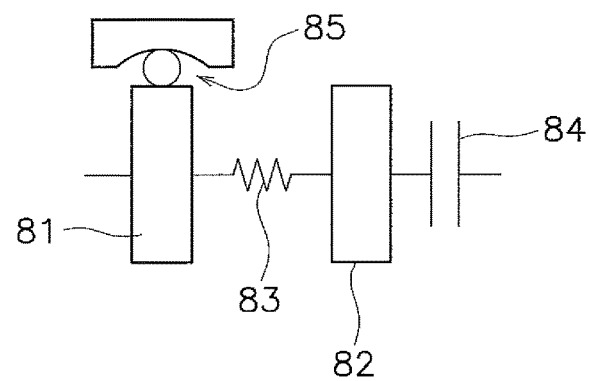
FIG. 19 is a schematic diagram showing application example 6 of the present disclosure.

(6) FIG. 19 shows an example of a power transmission device similar to that in FIG. 18. In this example, a centrifugal element is provided on the first inertia body 81. Additionally, the cam mechanism 85 is provided to be actuated with use of a centrifugal force acting on the centrifugal element. A configuration applicable to the cam mechanism 85 is similar to that in the aforementioned respective exemplary embodiments.

Figure 20:
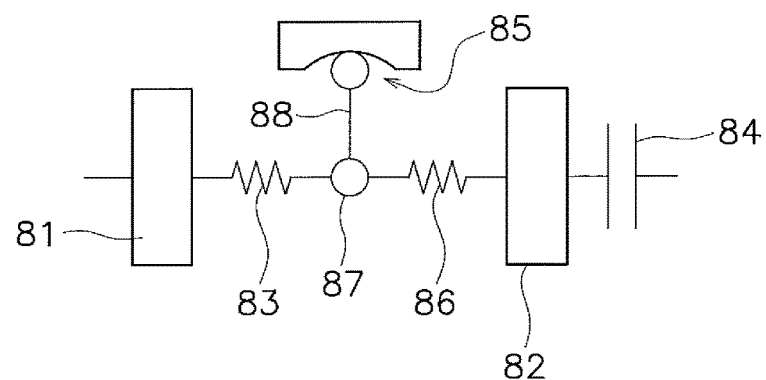
FIG. 20 is a schematic diagram showing application example 7 of the present disclosure.

(7) A power transmission device shown in FIG. 20 includes another damper 86 and an intermediate member 87 provided between the two dampers 83 and 86 in addition to the configurations shown in FIGS. 18 and 19. The intermediate member 87 is rotatable relatively to the first inertia body 81 and the second inertia body 82.

In the example shown in FIG. 20, a centrifugal element 88 is provided on the intermediate member 87, and the cam mechanism 85 is provided to be actuated with use of a centrifugal force acting on the centrifugal element 88. A configuration applicable to the cam mechanism 85 is similar to that in the aforementioned respective exemplary embodiments.

Figure 21:
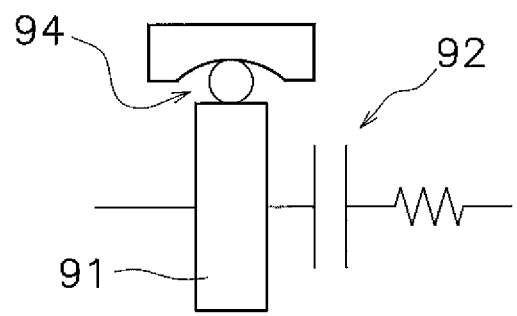
FIG. 21 is a schematic diagram showing application example 8 of the present disclosure.

(8) FIG. 21 is a schematic diagram of a power transmission device that a clutch device is provided on one flywheel. In FIG. 21, a first inertia body 91 includes one flywheel and a clutch cover of a clutch device 92. In this example, a centrifugal element is provided on any of the rotary members composing the first inertia body 91, and a cam mechanism 94 is provided to be actuated with use of a centrifugal force acting on the centrifugal element. A configuration applicable to the cam mechanism 94 is similar to that in the aforementioned respective exemplary embodiments.

Figure 22:
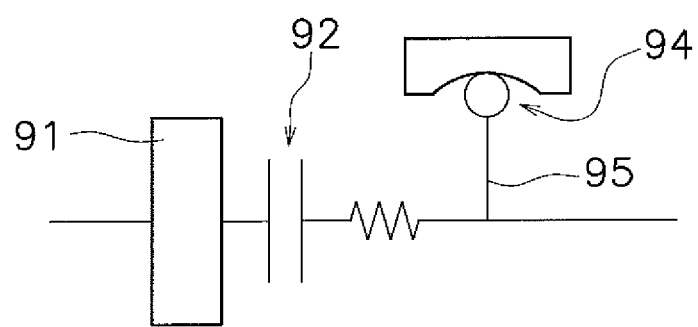
FIG. 22 is a schematic diagram showing application example 9 of the present disclosure.

(9) FIG. 22 shows an example of a power transmission device similar to that in FIG. 21. In this example, a centrifugal element 95 is provided on an output side of the clutch device 92. Additionally, the cam mechanism 94 is provided to be actuated with use of a centrifugal force acting on the centrifugal element 95. A configuration applicable to the cam mechanism 94 is similar to that in the aforementioned respective exemplary embodiments.

(10) The torque fluctuation inhibiting device according to the present disclosure can be disposed on any of the rotary members composing the transmission, and furthermore, can be disposed on an output-side shaft (a propeller shaft or a drive shaft) of the transmission, although these configurations are not shown in the drawings.

(11) As another application example, the torque fluctuation inhibiting device of the present disclosure can be further applied to a heretofore well-known dynamic damper device or a power transmission device provided with a pendulum-type damper device.

INDUSTRIAL APPLICABILITY

According to the device of the present disclosure, in a device for inhibiting torque fluctuations in a rotary member, a peak of torque fluctuations can be reduced in a relatively wide rotational speed range.

REFERENCE SIGNS LIST

1 Torque converter
12 Output-side rotor
14 Torque fluctuation inhibiting device
20, 40, 61 Inertia ring (mass body)
21, 31, 78, 88, 95 Centrifugal element
22, 32, 74, 85, 94 Cam mechanism
23 Coil spring (urging member)
24 Actuation preventing mechanism
241, 242 Turn member
241a, 242a Pawl part
241b, 242b Weight part
243 Pin
25 Roller
26, 31a Cam
30 Friction reducing member
65 Inertia body
66 Holding ring
71 Input-side rotor
72 Output-side rotor 73, 75, 83, 86 Damper
76, 87 Intermediate member
77 Float member
80 Flywheel
81, 91 First inertia body
82 Second inertia body
84, 92 Clutch device

The invention claimed is:

1. A torque fluctuation inhibiting device for inhibiting torque fluctuations in a rotor to which a torque is inputted, the torque fluctuation inhibiting device comprising:
 a mass body disposed to be rotatable with the rotor and be rotatable relatively to the rotor;
 a plurality of centrifugal elements, each of the plurality of centrifugal elements disposed to receive a centrifugal force to be generated by rotation of the rotor and the mass body, each of the plurality of centrifugal elements movable in a radial direction;
 an actuation preventing mechanism for restricting at least one of the plurality of centrifugal elements from moving outward in the radial direction when the rotor or the mass body is rotated at a predetermined speed or greater; and
 a cam mechanism for converting the centrifugal force into a circumferential force with use of actuation of each of the plurality of centrifugal elements moved in the radial direction by the centrifugal force when a relative displacement is produced between the rotor and the mass body in a rotational direction, the circumferential force directed to reduce the relative displacement.

2. The torque fluctuation inhibiting device according to claim 1, wherein
 the actuation preventing mechanism includes
  a pin disposed on the rotor or the mass body on which the plurality of centrifugal elements are disposed, the pin extending in a direction arranged along a rotational axis direction of the rotor, and
  a turn member turnably supported about the pin, the turn member including a pawl part and a weight part, the pawl part for making contact with an outer peripheral surface of the at least one of the plurality of centrifugal elements, the pawl part provided on one end of the turn member, the weight part provided on the other end of the turn member, the one end and the other end disposed circumferentially on both sides of the pin, and
 the weight part is turned to an outer peripheral side in conjunction with the rotation of the rotor and the mass body, and the pawl part prevents the at least one of the plurality of centrifugal elements from moving in the radial direction when the rotor or the mass body is rotated at the predetermined speed or greater.

3. The torque fluctuation inhibiting device according to claim 2, wherein the actuation preventing mechanism further includes an urging member, the urging member for urging the turn member such that the weight part is moved to an inner peripheral side.

4. The torque fluctuation inhibiting device according to claim 3, wherein the mass body is disposed on an outer or inner periphery of the rotor.

5. The torque fluctuation inhibiting device according to claim 4, wherein
 one of the rotor and the mass body includes a plurality of recesses on an outer peripheral surface thereof, the one of the rotor and the mass body disposed on the inner peripheral side, and
 each of the plurality of centrifugal elements is accommodated in each of the plurality of recesses so as to be movable in the radial direction.

6. The torque fluctuation inhibiting device according to claim 5, wherein a friction coefficient between each of the plurality of centrifugal elements and each of the plurality of recesses of the one of the rotor and the mass body is less than or equal to 0.1.

7. The torque fluctuation inhibiting device according to claim 5, wherein a friction reducing member is disposed between a lateral surface of each of the plurality of centrifugal elements and each of the plurality of recesses of the one of the rotor and the mass body so as to reduce friction that occurs in movement of each of the plurality of centrifugal elements, the lateral surface disposed along a moving direction of each of the plurality of centrifugal elements.

8. The torque fluctuation inhibiting device according to claim 5, wherein the cam mechanism includes
 a cam follower provided on each of the plurality of centrifugal elements, and
 a cam with which the cam follower makes contact, the cam provided on an inner peripheral surface of the other of the rotor and the mass body, the other of the rotor and the mass body disposed on the outer peripheral side, the cam having a shape for making the circumferential force vary in accordance with an amount of the relative displacement between the rotor and the mass body in the rotational direction.

9. The torque fluctuation inhibiting device according to claim 8, further comprising:
 an urging member disposed inside one of the plurality of recesses, the urging member for urging one of the plurality of centrifugal elements outward in the radial direction such that the cam follower of the one of the plurality of centrifugal elements makes contact with the cam while the rotor and the mass body are not being rotated.

10. The torque fluctuation inhibiting device according to claim 8, wherein the cam follower is a roller disposed on the outer peripheral surface of each of the plurality of centrifugal elements.

11. The torque fluctuation inhibiting device according to claim 8, wherein the cam follower is a protruding part integrated with each of the plurality of centrifugal elements, the protruding part provided on the outer peripheral surface of each of the plurality of centrifugal elements.

12. The torque fluctuation inhibiting device according to claim 5, wherein the cam mechanism includes
 a cam follower provided on an inner peripheral surface of the other of the rotor and the mass body, the other of the rotor and the mass body disposed on the outer peripheral side, and
 a cam for making contact at an outer peripheral surface thereof with the cam follower, the cam provided on each of the plurality of centrifugal elements, the cam having a shape for making the circumferential force vary in accordance with an amount of the relative displacement between the rotor and the mass body in the rotational direction.

13. The torque fluctuation inhibiting device according to claim 4, wherein
 one of the rotor and the mass body includes a plurality of recesses on an inner peripheral surface thereof, the one of the rotor and the mass body disposed on the outer peripheral side, each of the plurality of centrifugal elements is accommodated in each of the plurality of recesses so as to be movable in the radial direction, and the cam mechanism includes
- a cam follower provided on each of the plurality of centrifugal elements, and
- a cam with which the cam follower makes contact, the cam provided on an inner peripheral surface of the other of the rotor and the mass body, the other of the rotor and the mass body disposed on the inner peripheral side, the cam having a shape for making the circumferential force vary in accordance with an amount of the relative displacement between the rotor and the mass body in the rotational direction.

14. The torque fluctuation inhibiting device according to claim 1, wherein the mass body has a continuous annular shape.

15. The torque fluctuation inhibiting device according to claim 1, wherein the mass body includes
- a plurality of divided mass bodies disposed in circumferential alignment, and
- a holding member for holding the plurality of divided mass bodies in the radial direction.

16. A torque converter disposed between an engine and a transmission, the torque converter comprising:
- an input-side rotor to which the torque is inputted from the engine;
- an output-side rotor for outputting the torque to the transmission;
- a damper disposed between the input-side rotor and the output-side rotor; and
- the torque fluctuation inhibiting device recited in claim 1.

17. The torque converter according to claim 16, wherein the torque fluctuation inhibiting device is disposed on the input-side rotor.

18. The torque converter according to claim 16, wherein the torque fluctuation inhibiting device is disposed on the output-side rotor.

19. The torque converter according to claim 16, wherein the damper includes
- a first damper to which the torque is inputted from the input-side rotor,
- a second damper for outputting the torque to the output-side rotor, and
- an intermediate member provided between the first damper and the second damper, and the torque fluctuation inhibiting device is disposed on the intermediate member.

20. The torque converter according to claim 16, wherein the damper includes a plurality of coil springs, the torque converter further comprises a float member, the float member rotatable relatively to the input-side rotor and the output-side rotor, the float member for supporting the plurality of coil springs, and the torque fluctuation inhibiting device is disposed on the float member.

21. A power transmission device comprising:
- a flywheel including a first inertia body, a second inertia body and a damper, the first inertia body rotated about a rotational axis, the second inertia body rotated about the rotational axis, the second inertia body rotatable relatively to the first inertia body, the damper disposed between the first inertia body and the second inertia body;
- a clutch device provided on the second inertia body of the flywheel; and
- the torque fluctuation inhibiting device recited in claim 1.

22. The power transmission device according to claim 21, wherein the torque fluctuation inhibiting device is disposed on the second inertia body.

23. The power transmission device according to claim 21, wherein the torque fluctuation inhibiting device is disposed on the first inertia body.

24. The power transmission device according to claim 21, wherein the damper includes
- a first damper to which the torque is inputted from the first inertia body,
- a second damper for outputting the torque to the second inertia body, and
- an intermediate member provided between the first damper and the second damper, and the torque fluctuation inhibiting device is disposed on the intermediate member.

* * * * *